US012710821B2

(12) United States Patent
Sakamoto

(10) Patent No.: US 12,710,821 B2
(45) **Date of Patent: *Aug. 18, 2026**

(54) VR SICKNESS REDUCTION SYSTEM, HEAD-MOUNTED DISPLAY, VR SICKNESS REDUCTION METHOD, AND PROGRAM

(71) Applicant: Sony Interactive Entertainment Inc., Tokyo (JP)

(72) Inventor: Jun Sakamoto, Chiba (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,709

(22) Filed: May 12, 2023

(65) Prior Publication Data

US 2023/0280834 A1 Sep. 7, 2023

Related U.S. Application Data

(63) Continuation of application No. 17/287,004, filed as application No. PCT/JP2019/040723 on Oct. 16, 2019, now Pat. No. 11,687,159.

(51) Int. Cl.
*G06F 3/01* (2006.01)
*A63F 13/525* (2014.01)
(Continued)

(52) U.S. Cl.
CPC ............ *G06F 3/016* (2013.01); *A63F 13/525* (2014.09); *G06T 7/20* (2013.01); *G06T 7/70* (2017.01); *A63F 2300/8082* (2013.01)

(58) Field of Classification Search
CPC ................................. G06F 3/016; G06T 7/70
See application file for complete search history.

(56) References Cited

U.S. PATENT DOCUMENTS 8,619,080 B2 12/2013 Avent
9,999,835 B2 6/2018 Watson
(Continued)

FOREIGN PATENT DOCUMENTS

CN 107621883 A 1/2018
JP 2000339490 A 12/2000
(Continued)

OTHER PUBLICATIONS

International Search Report for corresponding PCT Application No. PCT/JP2019/040723, 2 pages, dated Jan. 7, 2020.
(Continued)

*Primary Examiner* — Yi Yang
(74) *Attorney, Agent, or Firm* — Kilpatrick Townsend & Stockton LLP

(57) ABSTRACT

Methods and/or apparatus provide for virtual sickness reduction by carrying out actions, including: positioning a headband of a head-mounted display to wrap around a user's head; causing a display section, coupled to the headband, to be positioned in front of the user when the head-mounted display is worn by the user, and to display a moving image representing a state viewed from a point of view; and controlling whether or not to rock a rocking section, which is located at a front of the headband, depending on an acceleration status of the point of view in the moving image displayed on the display section.

20 Claims, 9 Drawing Sheets

(51) Int. Cl.
*G06T 7/20* (2017.01)
*G06T 7/70* (2017.01)

(56) References Cited

U.S. PATENT DOCUMENTS 10,915,166 B2 2/2021 Ishii
2010/0092916 A1* 4/2010 Teixeira ................. A61C 17/20 15/167.1
2010/0165207 A1* 7/2010 Deng ..................... H04N 5/144 348/620
2014/0029762 A1* 1/2014 Xie ........................ H04R 5/027 381/94.1
2014/0176296 A1 6/2014 Morgan
2015/0109528 A1* 4/2015 Choi ...................... H04N 5/145 348/460
2015/0325027 A1 11/2015 Herman
2016/0030281 A1* 2/2016 Shafieloo ........... A61H 23/0245 601/48
2016/0228771 A1 8/2016 Watson
2016/0284129 A1 9/2016 Nishizawa
2017/0168257 A1 6/2017 Yoshimuta
2018/0108253 A1* 4/2018 Kim ..................... G08G 1/0965
2018/0143433 A1* 5/2018 Fujimaki ............ G01C 21/3652
2018/0181367 A1 6/2018 Goi
2018/0255243 A1 9/2018 Nakamura
2019/0220087 A1 7/2019 Ishii

FOREIGN PATENT DOCUMENTS

JP 2017049468 A 3/2017
JP 2017182130 A 10/2017
JP 2018514005 A 5/2018
WO 2018012393 A1 7/2019

OTHER PUBLICATIONS

International Preliminary Report on Patentability and Written Opinion for corresponding PCT Application No. PCT/JP2019/040723, 17 pages, dated May 14, 2021.
Extended European Search Report for corresponding EP Application EP19879075, 17 Pages, dated Nov. 29, 2022.
Office Action for corresponding CN Application No. 201980069436.7, 31 pages, dated Jan. 4, 2024.
Decision to Grant a Patent for corresponding JP Application No. 2020-553765, 4 pages, dated Oct. 26, 2023.

* cited by examiner

START
S101
CHANGE POSITION OF VIRTUAL CAMERA AND IMAGE CAPTURING DIRECTION
S102
GENERATE FRAME IMAGE
S103
IS VIRTUAL CAMERA MAKING ACCELERATED MOTION?
N
Y
S104
EXECUTE DISPLAY CONTROL FOR FRAME IMAGE AND ROCKING CONTROL FOR ROCKING SECTION
S105
EXECUTE DISPLAY CONTROL FOR FRAME IMAGE
S106
GENERATE FRAME ROCKING CONTROL DATA
S107
UPDATE ROCKING CONTROL MOVING IMAGE DATA

VR SICKNESS REDUCTION SYSTEM, HEAD-MOUNTED DISPLAY, VR SICKNESS REDUCTION METHOD, AND PROGRAM

CROSS REFERENCE TO RELATED APPLICATIONS

This is a continuation application of U.S. patent application Ser. No. 17/287,004, accorded a filing date of Apr. 20, 2021, allowed, which is a national stage application of International Application No. PCT/JP2019/040723, filed Oct. 16, 2019, which claims priority to JP Application No. 2018-206572, filed Nov. 1, 2018, the entire disclosures of which are hereby incorporated by reference.

TECHNICAL FIELD

The present invention relates to a VR sickness reduction system, a head-mounted display, a VR sickness reduction method, and a program.

BACKGROUND ART

PTL 1 describes a technique for reducing sickness (what is called VR sickness) caused by virtual reality (VR) using a low-frequency vibration irrelevant to an event in a virtual environment.

[Citation List] [Patent Literature]

[PTL 1] U.S. Patent Application Publication No. 2015/0325027

[Summary] [Technical Problem]

The present inventors have studied a technique for reducing VR sickness by using a vibration motor or the like provided on a front surface of a housing of a head-mounted display (HMD) to rock the head of a user on which the HMD is mounted. The VR sickness is considered to be caused by a discrepancy between motion of a point of view and an experience of the user in a situation in which a moving image representing a state viewed from the point of view is displayed on a display section of the HMD positioned in front of the user. Thus, it is assumed that the VR sickness can be reduced by coordinating the displayed moving image with rocking of the head.

However, the technique described in PTL 1 uses the low-frequency vibration irrelevant to the event in the virtual environment to reduce the VR sickness as described above and does not perform coordination of the display on the HMD with the vibration for the purpose of reducing the VR sickness.

In view of the above-described circumstances, an object of the present invention is to provide a VR sickness reduction system, a head-mounted display, a VR sickness reduction method, and a program that can reduce VR sickness.

Solution to Problem

To accomplish the object, a VR sickness reduction system according to the present invention includes a head-mounted display including a display section positioned in front of a user when the head-mounted display is mounted on the user, a rocking section allowing rocking of a head of the user on which the head-mounted display is mounted, a display control section causing the display section to display a moving image representing a state viewed from a point of view, and a rocking control section controlling rocking of the rocking section depending on an acceleration status of the point of view in the moving image displayed on the display section.

In an aspect of the present invention, the rocking control section controls whether or not to rock the rocking section depending on whether or not the moving image displayed on the display section indicates a state in which the point of view is accelerated.

In this aspect, the display control section may cause the display section to display the moving image representing a state of a virtual space viewed from a virtual camera positioned in the virtual space and further include a determination section determining whether or not the virtual camera is making accelerated motion in the virtual space, and the rocking control section may control whether or not to rock the rocking section depending on a result of the determination by the determination section.

Alternatively, the system may further include an acquisition section acquiring rocking control moving image data including moving image data indicating the moving image and rocking control data allowing identification of a frame image in the moving image, the frame image representing a situation in which the point of view is accelerated, in which the display control section may cause the display section to display a moving image indicated by the moving image data included in the rocking control moving image data and further include a determination section determining, on a basis of the rocking control data included in the rocking control moving image data, whether or not the frame image representing the situation in which the point of view is accelerated is displayed on the display section, and the rocking control section may control whether or not to rock the rocking section depending on a result of the determination by the determination section.

In this aspect, the system may further include a rocking control data generation section generating the rocking control data on a basis of the moving image data.

Alternatively, the system may further include a rocking control moving image data generation section generating the rocking control moving image data including the moving image data indicating the moving image representing the state of the virtual space viewed from the virtual camera positioned in the virtual space and the rocking control data generated on the basis of the result of the determination of whether or not the virtual camera is making accelerated motion in the virtual space.

Additionally, in an aspect of the present invention, the display control section causes the display section to display the moving image representing a state of a virtual space viewed from a virtual camera positioned in the virtual space and further include a determination section determining whether or not the virtual camera is making accelerated motion in the virtual space, and the rocking control section controls rocking of the rocking section on a basis of a result of the determination by the determination section and a distance between the virtual camera and a virtual object positioned in the virtual space.

In this aspect, the rocking control section may control rocking of the rocking section on a basis of the result of the determination by the determination section and a distance between the virtual camera and the virtual object within an angle of view of the virtual camera.

Additionally, the rocking control section may control rocking of the rocking section on a basis of the result of the determination by the determination section and a distance between the virtual camera and the virtual object closest to the virtual camera.

Additionally, the rocking control section may determine whether or not to rock the rocking section on the basis of the result of the determination by the determination section and the distance between the virtual camera and the virtual object positioned in the virtual space.

Alternatively, the rocking control section may control an amount of rocking of the rocking section on the basis of the distance between the virtual camera and the virtual object positioned in the virtual space.

Additionally, in an aspect of the present invention, the rocking control section controls rocking of the rocking section on a basis of an amount of movement of an object in the moving image per unit time.

In this aspect, the rocking control section may control whether or not to rock the rocking section on the basis of the amount of movement of the object in the moving image per unit time.

Alternatively, the rocking control section may control an amount of rocking of the rocking section on the basis of the amount of movement of the object in the moving image per unit time.

Additionally, in an aspect of the present invention, the system further includes an acquisition section acquiring rocking control data including moving image data indicating the moving image and rocking control data allowing identification of an acceleration status of the point of view in the moving image, in which the display control section causes the display section to display the moving image indicated by the moving image data included in the rocking control moving image data, and further includes a determination section determining, on a basis of the rocking control data included in the rocking control moving image data, the acceleration status of the point of view in the moving image displayed on the display section, and the rocking control section controls rocking of the rocking control section depending on a result of the determination by the determination section.

In this aspect, the system may further include a rocking control data generation section generating the rocking control data on a basis of the moving image data.

Alternatively, the system may further include a rocking control moving image data generation section generating the rocking control moving image data including the moving image data indicating the moving image representing a state of a virtual space viewed from a virtual camera positioned in a virtual space and the rocking control data generated on a basis of a result of determination of whether or not the virtual camera is making accelerated motion in the virtual space.

Additionally, in an aspect of the present invention, the rocking section is provided on a front surface of a housing of the head-mounted display.

In addition, a head-mounted display according to the present invention includes a display section positioned in front of a user when the head-mounted display is mounted on the user, a rocking section allowing rocking of a head of the user, a display control section causing the display section to display a moving image representing a state viewed from a point of view, and a rocking control section controlling rocking of the rocking section depending on an acceleration status of the point of view in the moving image displayed on the display section.

Additionally, a VR sickness reduction method according to the present invention includes the steps of causing a display section positioned in front of a user when a head-mounted display is mounted on the user to display a moving image representing a state viewed from a point of view, and controlling whether or not to rock a rocking section allowing a head of the user on which the head-mounted display is mounted, depending on an acceleration status of the point of view in the moving image displayed on the display section.

In addition, a program according to the present invention causes a computer to execute procedural steps of causing a display section positioned in front of a user when a head-mounted display is mounted on the user to display a moving image representing a state viewed from a point of view, and controlling whether or not to rock a rocking section allowing a head of the user on which the head-mounted display is mounted, depending on an acceleration status of the point of view in the moving image displayed on the display section.

DESCRIPTION OF EMBODIMENTS

An embodiment of the present invention will be described with reference to the drawings.

Figure 1:
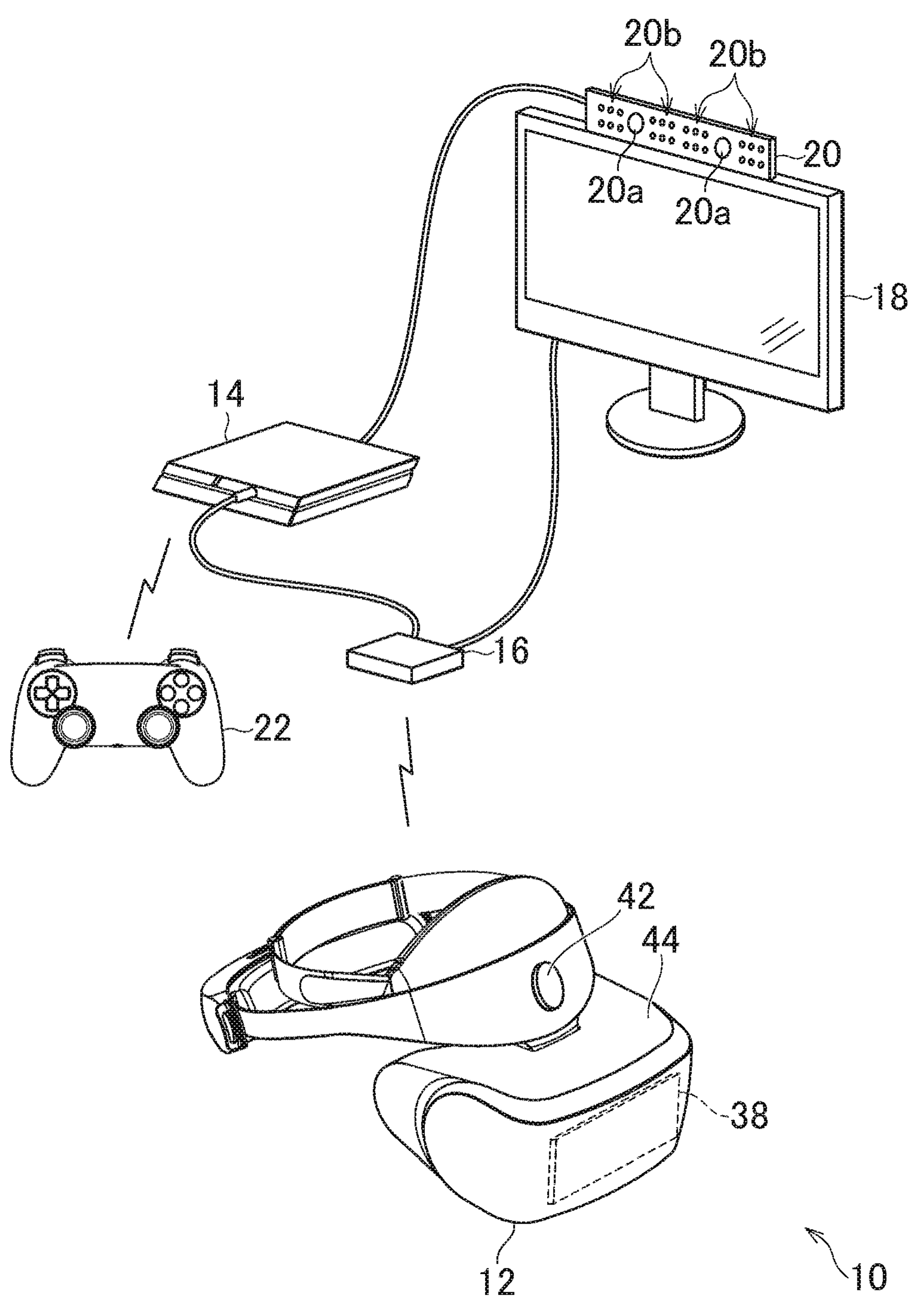
FIG. 1 is a diagram illustrating a general configuration of an entertainment system according to an embodiment of the present invention.
Figure 2A:
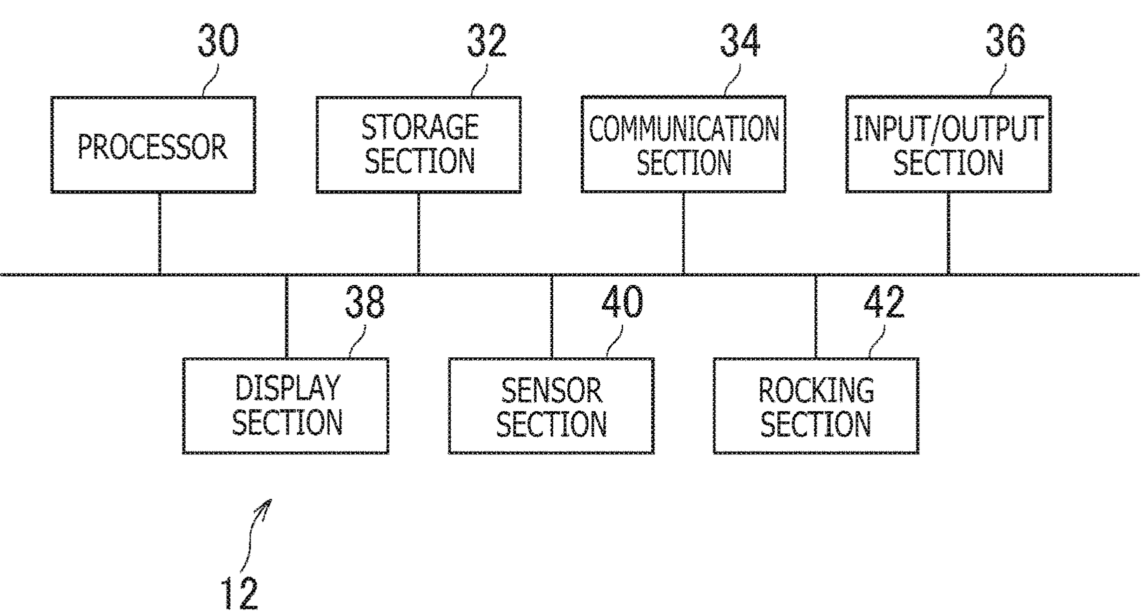
FIG. 2A is a diagram illustrating an example of a configuration of a head-mounted display according to an embodiment of the present invention.
Figure 2B:
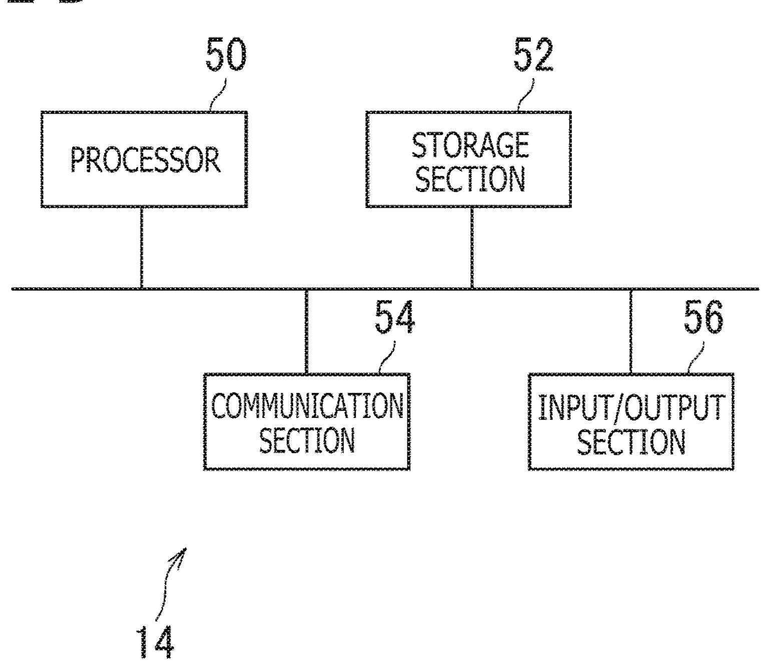
FIG. 2B is a diagram illustrating an example of a configuration of an entertainment apparatus according to an embodiment of the present invention.

FIG. 1 is a diagram illustrating an example of a general configuration of an entertainment system 10 according to an embodiment of the present invention. FIG. 2A is a diagram illustrating an example of a configuration of a head-mounted display (HMD) 12 according to the present embodiment. FIG. 2B is a diagram illustrating an example of a configuration of an entertainment apparatus 14 according to the present embodiment.

As illustrated in FIG. 1, the entertainment system 10 according to the present embodiment includes an HMD, an entertainment apparatus 14, a relay apparatus 16, a display 18, a camera microphone unit 20, and a controller 22.

For example, as illustrated in FIG. 2A, the HMD 12 according to the present embodiment includes a processor 30, a storage section 32, a communication section 34, an input/output section 36, a display section 38, a sensor section 40, and a rocking section 42.

The processor 30 is, for example, a program control device such as a microprocessor which operates in accordance with a program installed in the HMD 12.

The storage section 32 includes, for example, storage elements such as a read only memory (ROM) and a random access memory (RAM). The storage section 32 stores programs executed by the processor 30, and the like.

The communication section 34 is, for example, a communication interface such as a wireless local area network (LAN) module.

The input/output section 36 is, for example, an input/output port, for example, an HDMI (registered trademark) (High-Definition Multimedia Interface) port or a universal serial bus (USB) port.

The display section 38 is, for example, a display such as a liquid crystal display or an organic electroluminescent (EL) display and is caused to display a video and the like generated by the entertainment apparatus 14. As illustrated in FIG. 1, the display section 38 is positioned in front of a user when the HMD 12 is mounted on the user. The display section 38 may, for example, receive a video signal output by the entertainment apparatus 14 and relayed by the relay apparatus 16 and output a video represented by the video signal. The display section 38 according to the present embodiment can be caused to display a three-dimensional image by, for example, displaying an image for the left eye and an image for the right eye. Note that the display section 38 may be configured to impossible to display three-dimensional images and to be capable of displaying only two-dimensional images.

The sensor section 40 is, for example, a sensor such as an acceleration sensor or a motion sensor. The sensor section 40 may output measurement results such as the orientation, the amount of rotation, and the amount of movement of the HMD 12, to the processor 30 at a predetermined sampling rate.

The rocking section 42 is, in the present embodiment, for example, a device that rocks in accordance with an input signal. As illustrated in FIG. 1, in the present embodiment, the rocking section 42 is provided on a front surface of a housing 44 of the HMD 12. The rocking section 42 is, for example, a vibrator such as a vibration motor. Additionally, in a case where the rocking section 42 is an eccentric motor, a spindle included in the rocking section 42 may rotate as a shaft extending generally along a front-back direction to vibrate the rocking section 42.

In an example in FIG. 1, one rocking section 42 is provided in the center of the front surface of the housing 44 of the HMD 12. Further, the rocking section 42 can rock the head of the user on which the HMD 12 is mounted. Note that a plurality of the rocking sections 42 may be provided in the HMD 12. Additionally, in this case, a plurality of rocking sections 42 may be provided laterally symmetrically.

The entertainment apparatus 14 according to the present embodiment is, for example, a computer such as a game console, a digital versatile disc (DVD) player, or a Blu-ray (registered trademark) player. The entertainment apparatus 14 according to the present embodiment generates videos and sound by, for example, execution of a stored game program or a game program recorded in an optical disc, reproduction of a stored content or a content recorded in an optical disc, and the like. The entertainment apparatus 14 according to the present embodiment then outputs a video signal representing a video generated and a sound signal representing sound generated, to the display 18 via the relay apparatus 16.

For example, as illustrated in FIG. 2B, the entertainment apparatus 14 according to the present embodiment includes a processor 50, a storage section 52, a communication section 54, and an input/output section 56.

The processor 50 is, for example, a program control device such as a central processing unit (CPU) which operates in accordance with programs installed in the entertainment apparatus 14. The processor 50 according to the present embodiment includes a GPU (Graphics Processing Uni) drawing images in a frame buffer on the basis of graphics commands and data fed from the CPU.

The storage section 52 is, for example, storage elements such as a ROM and a RAM, a hard disk drive, or the like. The storage section 52 stores programs executed by the processor 50, and the like. Additionally, the storage section 52 according to the present embodiment is provided with a region of the frame buffer in which the GPU draws images.

The communication section 54 is, for example, a communication interface such as a wireless LAN module.

The input/output section 56 is an input/output port such as an HDMI (registered trademark) (High-Definition Multimedia Interface) port or a USB port.

The relay apparatus 16 according to the present embodiment is, for example, a control section such as a computer including a control circuit, an image processing circuit, or a sound processing circuit, a storage section such as a memory, and the like. The relay apparatus 16 relays a video signal and a sound signal output from the entertainment apparatus 14 to the HMD 12 or the display 18.

The display 18 according to the present embodiment is, for example, a liquid crystal display and is caused to display a video represented by the video signal output from the entertainment apparatus 14.

The camera microphone unit 20 according to the present embodiment includes, for example, a camera 20*a* outputting a captured image of a subject to the entertainment apparatus 14 and a microphone 20*b* acquiring surrounding sound, converting the sound into sound data, and outputting the sound data to the entertainment apparatus 14. Additionally, the camera 20*a* according to the present embodiment is a stereo camera.

The HMD 12 and the relay apparatus 16 can, for example, wirelessly transmit and receive data to and from each other. Note that the HMD 12 and the relay apparatus 16 may be connected via a cable such as an HDMI cable or a USB cable. The entertainment apparatus 14 and the relay apparatus 16 are connected, for example, via an HDMI cable or a USB cable. The relay apparatus 16 and the display 18 are connected, for example, via an HDMI cable. The entertainment apparatus 14 and the camera microphone unit 20 are connected, for example, via an auxiliary (AUX) cable or the like.

The controller 22 according to the present embodiment is an operation input apparatus used to input operation to the entertainment apparatus 14. The user can use the controller 22 to provide various operation inputs by depressing direction keys or buttons included in the controller 22 or tilting an operation stick. In the present embodiment, the controller 22 outputs, to the entertainment apparatus 14, input data associated with the operation inputs. Additionally, the controller 22 according to the present embodiment includes a USB port. By connecting to the entertainment apparatus 14 via a USB cable, the controller 22 can output, via the cable, input data to the entertainment apparatus 14. In addition, the controller 22 according to the present embodiment includes a wireless communication module and the like and is thus enabled to wirelessly output input data to the entertainment apparatus 14.

Figure 3:
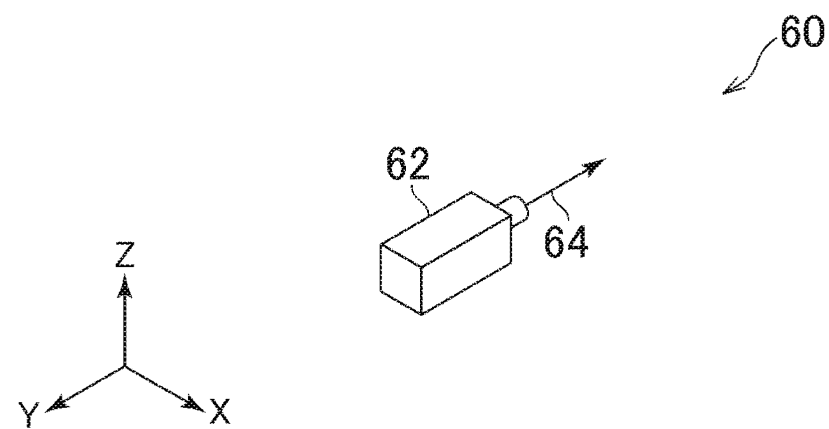
FIG. 3 is a diagram illustrating an example of a virtual space.

In the present embodiment, for example, a program for a first-person point of view game is executed in the entertainment apparatus 14. Then, for example, a moving image is generated that represents a state viewed in the image capturing direction 64 from a virtual camera 62 positioned in a virtual space 60 illustrated in FIG. 3. In this regard, for example, at a predetermined frame rate, a frame image is generated that represents a state viewed in the image capturing direction 64 from the position of the virtual camera 62 in the frame. Additionally, the virtual space 60 illustrated in FIG. 3 is a virtual three-dimensional space. The position and the image capturing direction 64 of the virtual camera 62 vary, for example, according to operation of the controller 22 by a player or a play status of a game such as an event occurring in the game. A content displayed on the display section 38 of the HMD 12 varies according to a variation in the position and the image capturing direction 64 of the virtual camera 62. Processing according to the play status of the game may be executed at the above-described predetermined frame rate, the processing including update of the position and the image capturing direction 64 of the virtual camera 62, generation of frame images, and display of frame images.

Further, in the present embodiment, for example, whether or not the virtual camera 62 is making accelerated motion is determined on the basis of movement of the virtual camera 62. Here, accelerated motion refers to, for example, circular motion, uniform accelerated motion, variable accelerated motion, or the like. Note that the motion to which the accelerated motion refers may or may not include angular acceleration motion such as uniform accelerated motion or variable accelerated motion. For example, in a first-person point of view game, when a first-person point of view character jumps or dashes, the virtual camera 62 is determined to be making accelerated motion. In this regard, for example, whether or not the virtual camera 62 is making accelerated motion may be determined on the basis of the position or the image capturing direction 64 of the virtual camera 62 in a predetermined number of the latest frames.

Then, in accordance with the result of the determination, rocking of the rocking section 42 (for example, whether or not to rock the rocking section 42) is controlled. In this regard, in a case where the rocking section 42 is a vibration motor, the vibration motor may be controlled such that vibration has a frequency band of 10 to 20 Hertz and an acceleration value (G value) of 0.05 to 0.5 G.

As described above, in the present embodiment, whether or not to rock the rocking section 42 is controlled depending on whether or not the moving image displayed on the display section 38 represents a situation in which the virtual camera 62 is accelerating.

Sickness (what is called VR sickness) of the user on which the HMD 12 is mounted is considered to be caused by a discrepancy between motion of the point of view and an experience of the user in a situation in which a moving image representing a state viewed from the point of view is displayed on the display section 38 positioned in front of the user. In the above-described example, the position of the point of view corresponds to the position of the virtual camera 62. Additionally, the direction of the point of view corresponds to the image capturing direction 64. In other words, the VR sickness in the above-described example is considered to be caused by a discrepancy between the motion of the virtual camera 62 and the experience of the user. In particular, the experience of the head including a concentration of sensory organs is assumed to be significantly associated with the VR sickness.

In the present embodiment, rocking of the rocking section 42 is controlled depending on an acceleration status of the point of view in the moving image displayed on the display section 38. For example, as described above, whether or not to rock the rocking section 42 is controlled depending on whether or not the moving image displayed on the display section 38 represents a situation in which the point of view is being accelerated. Thus, according to the present embodiment, the displayed moving image and the rocking of the head are coordinated to enable a reduction in VR sickness.

Note that the present invention can be applied to a situation in which a moving image of an actual space captured by an actual camera is displayed on the display section 38 as well as to a situation in which the moving image of the virtual space 60 captured by the virtual camera 62 is displayed on the display section 38. For example, whether or not to rock the rocking section 42 may be controlled, for example, depending on whether or not the moving image represents a situation in which the actual camera is being accelerated. Additionally, the present invention can be applied to general moving images such as moving images of video content whose images are not moving images captured by an actual camera or the virtual camera 62 and which represent the state viewed from the point of view.

Additionally, as described above, the rocking section 42 according to the present embodiment is attached to the front surface of the housing 44 of the HMD 12. Thus, the rocking section 42 can be easily attached to the HMD 12.

Note that the rocking section 42 need not be provided on the front surface of the housing 44 of the HMD 12 as long as the rocking section 42 can rock the head of the user on which the HMD 12 is mounted. For example, the rocking section 42 may be provided on an inner surface of the housing 44. Additionally, the rocking section 42 need not be provided in the HMD 12.

Figure 4:
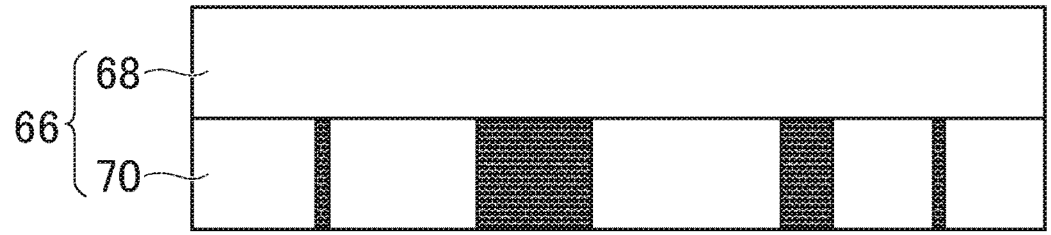
FIG. 4 is a diagram schematically illustrating an example of a data structure of rocking control moving image data.

FIG. 4 is a diagram schematically illustrating an example of a data structure of rocking control moving image data 66 according to the present embodiment. In the present embodiment, the rocking control moving image data 66 illustrate in FIG. 4 may be generated. The rocking control moving image data 66 include, for example, moving image data 68 and rocking control data 70.

The moving image data 68 is, for example, data indicating a moving image displayed on the display section 38 by reproduction and representing the state viewed from the point of view. In this regard, for example, while the moving image generated according to the motion of the virtual camera 62 is displayed on the display section 38, the moving image data 68 indicating the moving image may be generated.

The rocking control data 70 is, for example, data enabling identification of the acceleration status of the point of view in the moving image indicated by the moving image data 68. The rocking control data 70 may be, for example, data enabling identification of a frame image representing, in the moving image indicated by the moving image data 68, the situation in which the point of view is being accelerated.

In the present embodiment, for example, the moving image data 68 is assumed to include a plurality of frame images generated at a predetermined frame rate. Additionally, in the present embodiment, the rocking control data 70 is assumed to include a plurality of frame rocking control data associated with respective frame images. The frame rocking control data may be a flag set to 1 in a case where an associated frame image represents the situation in which the point of view is being accelerated, the flag being set to 0 in a case where the associated frame image does not represent the situation in which the point of view is being accelerated. In the rocking control data 70 illustrated in FIG. 4, frame rocking control data schematically expressed in black is associated with the frame image representing the situation in which the point of view is being accelerated, that is, has a value of 1.

Note that the data format of the rocking control data 70 is not limited to the above-described data format. For example, the rocking control data 70 may be data indicating the frame number of the frame image representing the situation in which the point of view is being accelerated.

The rocking control data 70 may be, for example, set in accordance with operation performed by an operator while viewing the moving image indicated by the moving image data 68. For example, for the frame image determined by the operator to represent the situation in which the point of view is being accelerated, the operator may perform an operation of setting 1 as a value for the frame rocking control data associated with the frame image. Then, in accordance with the operation, 1 may be set as a value for the frame rocking control data.

Additionally, an image analysis technique may be used to determine, for each frame image, whether or not the frame image represents the situation in which the point of view is being accelerated, on the basis of the moving image data 68. For example, whether or not the frame image represents the situation in which the point of view is being accelerated may be determined on the basis of a predetermined number of consecutive frame images ending with the frame image of interest. Then, on the basis of the result of the identification, the rocking control data 70 may be generated.

In addition, for example, the rocking control data 70 may be generated on the basis of the result of determination based on the motion of the virtual camera 62 and indicating whether or not the virtual camera 62 is making accelerated motion. For example, in the above-described example, 1 may be set as a value for the frame rocking control data associated with the frame image displayed at the timing when the rocking section 42 is controlled to rock.

Then, in the present embodiment, for example, in accordance with reproduction of the moving image indicated by the moving image data 68 included in the rocking control moving image data 66, rocking control may be performed on the basis of the rocking control data 70 included in the rocking control moving image data 66. For example, whether or not the frame image representing the situation in which the point of view is being accelerated is depicted on the display section 38 may be determined on the basis of the rocking control data 70. Then, when the frame image is determined to be displayed that represents the situation in which the point of view is being accelerated, the rocking section 42 may be controlled to rock. For example, in a case where the frame rocking control data associated with the frame image displayed on the display section 38 has a value of 1, the rocking section 42 may rock.

Additionally, for example, an acceleration value or an angular acceleration value for the point of view may be determined. Then, rocking control may be performed in accordance with the acceleration value or the angular acceleration value. For example, the rocking section 42 may be controlled such that a larger acceleration value or angular acceleration value causes the rocking section 42 to be rocked harder. Additionally, in contrast, when the moving image displayed on the display section 38 represents the situation in which the point of view is being accelerated, the rocking section 42 may be controlled to rock such that the rocking has a predetermined magnitude regardless of the acceleration value or angular acceleration value for the point of view.

Additionally, in a situation of a game distribution, while a game is being played, the rocking control moving image data 66 may be generated or transmitted to another entertainment system 10 connected via a network, in real time. Then, the entertainment system 10 having received the rocking control moving image data 66 may display the moving image indicated by the moving image data 68 included in the rocking control moving image data 66. In addition, the entertainment system 10 having received the rocking control moving image data 66 may control rocking of the rocking section 42 in coordination with the displayed moving image on the basis of the rocking control data 70 included in the rocking control moving image data 66.

Functions implemented in the entertainment apparatus 14 according to the present embodiment and processing executed by the entertainment apparatus 14 will further be described.

Figure 5:
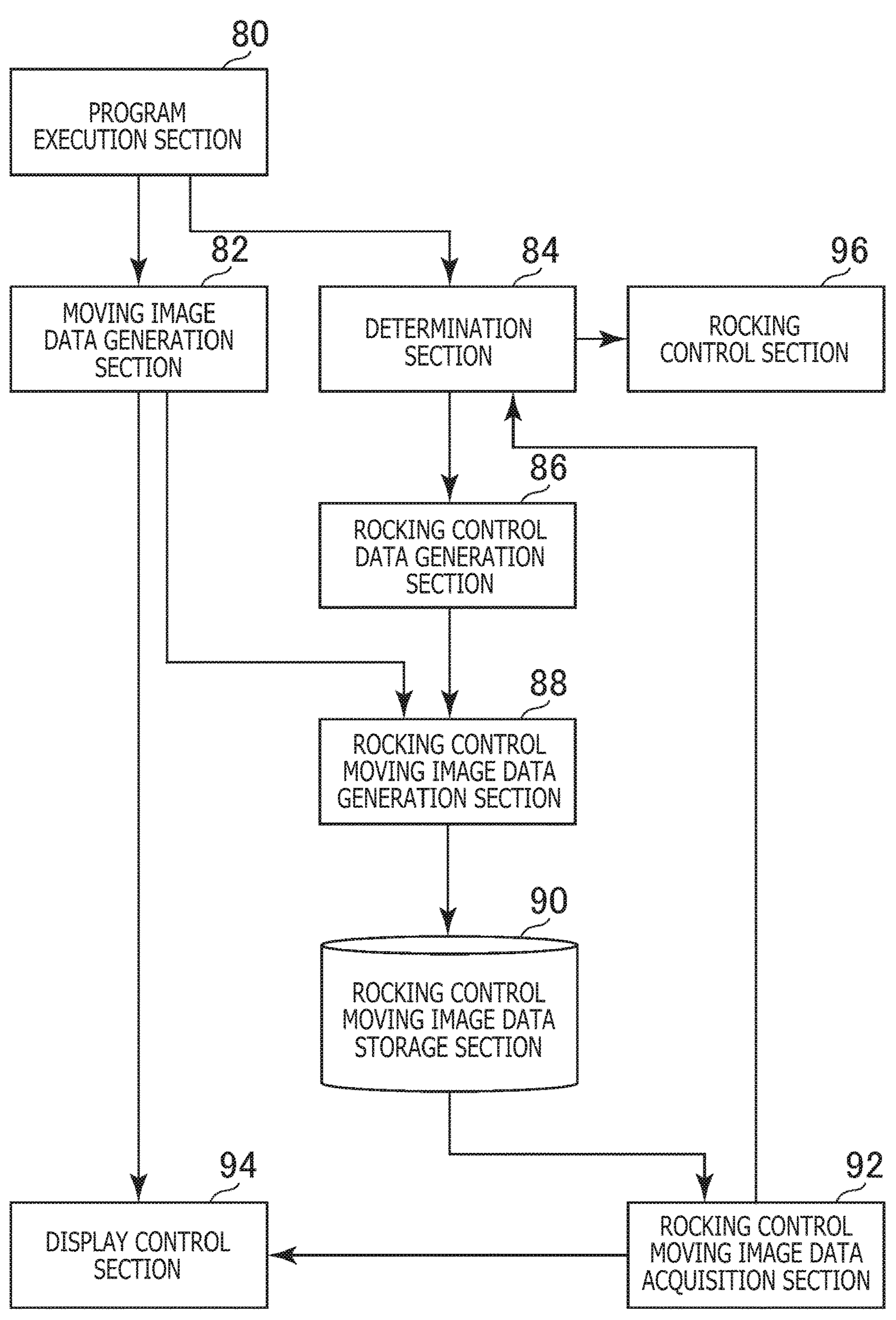
FIG. 5 is a functional block diagram illustrating functions implemented in an entertainment apparatus according to an embodiment of the present invention.

FIG. 5 is a functional block diagram illustrating an example of functions implemented in the entertainment apparatus 14 according to the present embodiment. Note that the entertainment apparatus 14 according to the present embodiment need not implement all of the functions illustrated in FIG. 5 and may implement functions other than the functions illustrated in FIG. 5.

As illustrated in FIG. 5, the entertainment apparatus 14 according to the present embodiment includes, for example, in terms of functions, a program execution section 80, a moving image data generation section 82, a determination section 84, a rocking control data generation section 86, a rocking control moving image data generation section 88, a rocking control moving image data storage section 90, a rocking control moving image data acquisition section 92, a display control section 94, and a rocking control section 96.

The processor 50 mainly implements the program execution section 80, the moving image data generation section 82, the determination section 84, the rocking control data generation section 86, and the rocking control moving image data generation section 88. The rocking control moving image data storage section 90 is mainly implemented in the storage section 52. The rocking control moving image data acquisition section 92 is mainly implemented in the processor 30 or the communication section 54. The display control section 94 and the rocking control section 96 are mainly implemented in the processor 50 and the input/output section 56.

The above-described functions are implemented by the processor 50 by executing a program installed in the entertainment apparatus 14 corresponding to a computer, the program including instructions corresponding to the functions. The program is supplied to the entertainment apparatus 14 via, for example, a computer readable information storage medium such as an optical disc, a magnetic disk, a magnetic tape, a magneto-optical disk, or a flash memory or via the Internet or the like.

The program execution section 80, in the present embodiment, for example, executes a program such as a game program.

The moving image data generation section 82, in the present embodiment, for example, generates moving image data 68 indicating a moving image corresponding to the result of execution of a program by the program execution section 80, such as a moving image corresponding to a play status of the game. The moving image data generation section 82 may generate a moving image representing the state of the virtual space 60 viewed from the virtual camera 62 positioned in the virtual space 60.

The determination section 84, in the present embodiment, for example, determines the acceleration status of the point of view in the frame image displayed on the display section 38. In this regard, the determination section 84 may determine whether or not the frame image representing the situation in which the point of view is being accelerated is depicted on the display section 38. The determination section 84 may determine, for example, whether or not the virtual camera 62 is making accelerated motion in the virtual space 60. In this case, as described above, the motion to which the accelerated motion refers may or may not include angular acceleration.

The rocking control data generation section 86, in the present embodiment, for example, generates the rocking control data 70 described above. The rocking control data generation section 86 may generate the rocking control data 70 on the basis of the result of the determination made by the determination section 84 and indicating whether or not the virtual camera 62 positioned in the virtual space 60 is making accelerated motion in the virtual space 60.

Additionally, the rocking control data generation section 86 may generate the rocking control data 70 on the basis of the moving image data 68 indicating the moving image representing the state viewed from the point of view. For example, the rocking control data generation section 86 may generate the rocking control data 70 on the basis of the moving image data 68 generated by the moving image data generation section 82.

The rocking control moving image data generation section 88, in the present embodiment, for example, generates the rocking control moving image data 66 described above. In this regard, the rocking control moving image data generation section 88 may generate, for example, rocking control moving image data 66 including the moving image data 68 generated by the moving image data generation section 82 and the rocking control data 70 generated by the rocking control data generation section 86. In this case, the moving image data 68 may correspond to data indicating the moving image representing the state of the virtual space 60 viewed from the virtual camera 62, and the rocking control data 70 may correspond to data corresponding to the result of the determination of whether or not the virtual camera 62 is making accelerated motion in the virtual space 60.

Additionally, the moving image data 68 included in the rocking control moving image data 66 need not be the moving image data 68 indicating the moving image corresponding to the result of execution of the program by the program execution section 80. The moving image data 68 included in the rocking control moving image data 66 may be, for example, the moving image data 68 indicating a moving image of the actual space captured by the actual camera, as described above. In addition, the moving image data 68 need not indicate the moving image corresponding to the play status of the game and may indicate, for example, a moving image of a content such as a movie. Additionally, the moving image indicated by the moving image data 68 need not be the moving image captured by the actual camera or the virtual camera 62.

The rocking control moving image data storage section 90, in the present embodiment, for example, stores the rocking control moving image data 66 described above. In this regard, the rocking control moving image data storage section 90 may store the rocking control moving image data 66 generated by the rocking control moving image data generation section 88.

Additionally, the rocking control moving image data 66 may be available for purchase by the user. The rocking control moving image data 66 purchased by the user may be stored in the rocking control moving image data storage section 90.

The rocking control moving image data acquisition section 92, in the present embodiment, for example, acquires the rocking control moving image data 66. In this regard, the rocking control moving image data acquisition section 92 may acquire the rocking control moving image data 66 stored in the rocking control moving image data storage section 90. Additionally, the rocking control moving image data acquisition section 92 may receive the rocking control moving image data 66 transmitted from another entertainment system 10.

The display control section 94, in the present embodiment, for example, causes the display section 38 to display the moving image representing the state viewed from the point of view. In this regard, for example, the display control section 94 may transmit the moving image to the HMD 12 via the relay apparatus 16. Then, the HMD 12 may cause the display section 38 to display the received moving image.

Additionally, the display control section 94 may cause the display section 38 to display the moving image representing the state of the virtual space 60 viewed from the virtual camera 62 positioned in the virtual space 60. In addition, the display control section 94 may cause the display section 38 to display the moving image representing the state of the actual space viewed from the actual camera positioned in the actual space.

Additionally, the display control section 94 may cause the display section 38 to display the moving image indicated by the moving image data 68 included in the rocking control moving image data 66 acquired by the rocking control moving image data acquisition section 92.

The rocking control section 96, in the present embodiment, for example, controls rocking of the rocking section 42 depending on the acceleration status of the point of view in the moving image displayed on the display section 38. The rocking control section 96 may control whether or not to rock the rocking section 42 depending on whether or not the moving image displayed on the display section 38 and representing the state viewed from the point of view represents the situation in which the point of view is being accelerated. In this regard, for example, the rocking control section 96 may transmit a control signal for controlling the rocking section 42, to the HMD 12 via the relay apparatus 16. Then, the HMD 12 may control rocking of the rocking section 42 on the basis of a control signal received.

Additionally, the rocking control section 96 may control whether or not to rock the rocking section 42 depending on the result of the determination by the determination section 84.

In addition, the determination section 84 may determine whether or not the frame image representing the situation in which the point of view is being accelerated is depicted on the display section 38, on the basis of the rocking control data 70 included in the rocking control moving image data 66 acquired by the rocking control moving image data acquisition section 92. For example, in a case where the frame rocking control data associated with the displayed frame image has a value of 1, the determination section 84 may determine that the frame image representing the situation in which the point of view is being accelerated is depicted on the display section 38. Then, the rocking control section 96 may control whether or not to rock the rocking section 42 depending on the result of the determination by the determination section 84.

Figure 6:
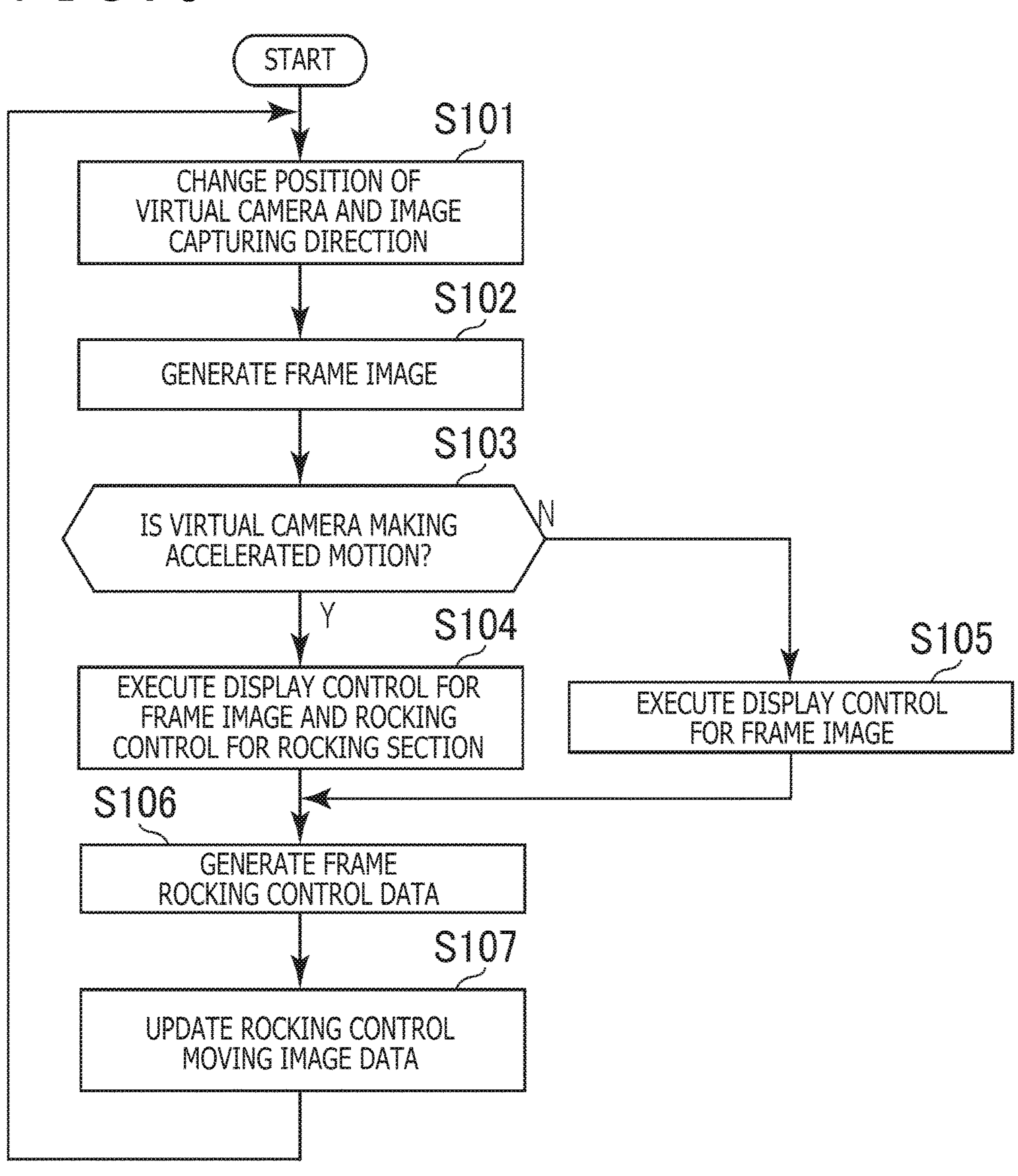
FIG. 6 is a flowchart illustrating an example of a flow of processing executed in the entertainment apparatus according to an embodiment of the present invention.

Here, an example of a flow of processing executed in the entertainment apparatus 14 according to the present embodiment will be described with reference to a flowchart illustrated in FIG. 6. The processing example illustrated in FIG. 6 is an example of a flow of rocking control processing by the rocking section 42 based on the motion of the virtual camera 62. Note that, in the present processing example assumes that null rocking control moving image data 66 generated by the rocking control moving image data generation section 88 in advance is stored in the rocking control moving image data storage section 90.

Additionally, processing illustrated at S101 to S107 in FIG. 6 is repeatedly executed at a predetermined frame rate.

First, the program execution section 80 changes the position and the image capturing direction 64 of the virtual camera 62 on the basis of an operation signal received from the controller 22 and the play status of the game including an event occurring in the game (S101).

Then, the moving image data generation section 82 generates a frame image representing a state viewed from the virtual camera 62 in the image capturing direction 64 (S102).

Then, the determination section 84 determines whether or not the virtual camera 62 is making accelerated motion (S103).

Here, it is assumed that the virtual camera 62 is determined to be making accelerated motion (S103: Y). In this case, the display control section 94 executes display control for causing the display section 38 of the HMD 12 to display the frame image generated by the processing illustrated at S102, and the rocking control section 96 executes rocking control for rocking the rocking section 42 (S104). In this case, the rocking section 42 rocks.

On the other hand, it is assumed that the virtual camera 62 is not making accelerated motion (S103: N). In this case, the display control section 94 executes display control for causing the display section 38 of the HMD 12 to display the frame image generated by the processing illustrated at S102 (S105). In this case, the rocking section 42 does not rock. Then, the rocking control section 96 may execute rocking control for preventing the rocking section 42 from rocking.

When the processing illustrated at S104 or S105 is ended, the rocking control data generation section 86 generates frame rocking control data in the present loop corresponding to the determination result in the processing illustrated at S103 (S106). In this regard, for example, in a case where the processing illustrated at S104 in the present loop is executed, frame rocking control data with a value of 1 is generated. Additionally, for example, in a case where the processing illustrated at S105 in the present loop is executed, frame rocking control data with a value of 0 is generated.

Then, the rocking control moving image data generation section 88 updates the rocking control moving image data 66 stored in the rocking control moving image data storage section 90 (S107). In this regard, for example, the frame image generated by the processing at S102 is added to the moving image data 68 included in the rocking control moving image data 66. Additionally, for example, the frame rocking control data in the present loop generated by the processing illustrated at S106 is added to the rocking control data 70 included in the rocking control moving image data 66, with the frame rocking control data associated with the frame image. Then, the loop returns to the processing illustrated at S101.

Note that the processing illustrated at S106 and the processing illustrated at S107 need not necessarily be executed.

Next, an example of a flow of another processing executed in the entertainment apparatus 14 according to the present embodiment will be described with reference to a flowchart illustrated in FIG. 7. The processing example illustrated in FIG. 7 is an example of a flow of rocking control processing of the rocking section 42 executed during reproduction of the moving image indicated by the moving image data 68 included in the rocking control moving image data 66 acquired by the rocking control moving image data acquisition section 92.

Figure 7:
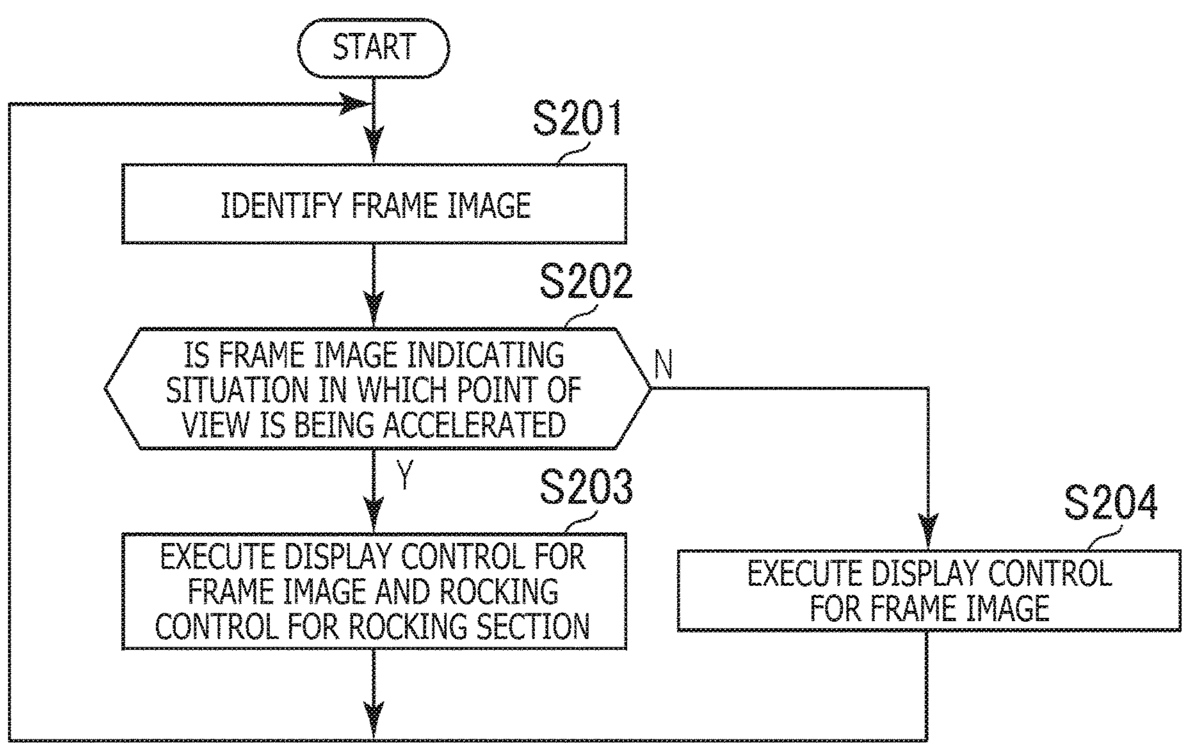
FIG. 7 is a flowchart illustrating an example of a flow of processing executed in the entertainment apparatus according to an embodiment of the present invention.

Additionally, processing illustrated at S201 to S204 in FIG. 7 is repeatedly executed at the predetermined frame rate.

First, the display control section 94 identifies the frame image in the present loop indicated by the moving image data 68 included in the rocking control moving image data 66 (S201).

Then, the determination section 84 determines, on the basis of the rocking control data 70 included in the rocking control moving image data 66, whether or not the frame image identified by the processing illustrated at S201 represents the situation in which the point of view is being accelerated (S202). In this regard, in a case where the frame rocking control data associated with the frame image identified by the processing illustrated at S201 has a value of 1, the frame image identified by the processing illustrated at S201 is determined to represent the situation in which the point of view is being accelerated. Additionally, in a case where the frame rocking control data associated with the frame image identified by the processing illustrated at S201 has a value of 0, the frame image identified by the processing illustrated at S201 is determined not to represent the situation in which the point of view is being accelerated.

Here, it is assumed that the frame image identified by the processing illustrated at S201 is determined to represent the situation in which the point of view is being accelerated (S202: Y). In this case, the display control section 94 executes display control for causing the display section 38 of the HMD 12 to display the frame image identified by the processing illustrated at S201, and the rocking control section 96 executes rocking control for preventing the rocking section 42 (S203). In this case, the rocking section 42 rocks.

On the other hand, it is assumed that the frame image identified by the processing illustrated at S201 is determined not to represent the situation in which the point of view is being accelerated (S202: N). In this case, the display control section 94 executes display control for causing the display section 38 of the HMD 12 to display the frame image generated by the processing illustrated at S102 (S204). In this case, the rocking section 42 does not rock. In this regard, the rocking control section 96 may execute rocking control for preventing the rocking section 42 from rocking.

Then, the loop returns to the processing illustrated at S201.

Figure 8:
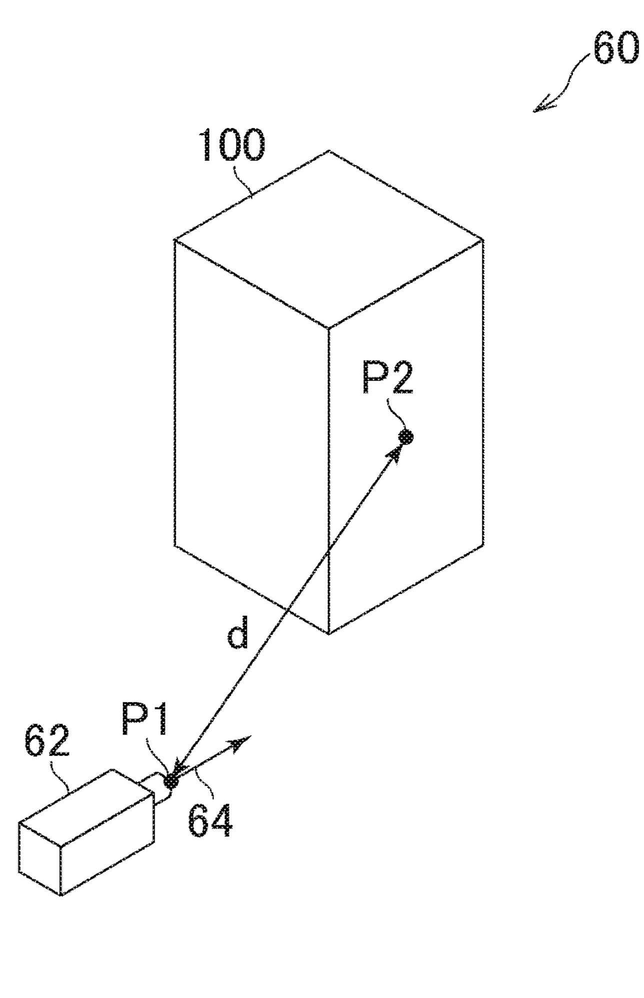
FIG. 8 is a diagram illustrating an example of a virtual space.
Figure 8:
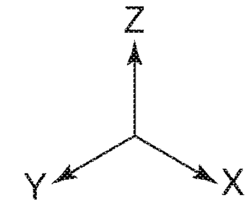

Note that, in the present embodiment, the rocking control section 96 may control rocking of the rocking section 42 on the basis of the result of the determination by the determination section 84 and a distance d between a virtual object 100 and the virtual camera 62 positioned in the virtual space 60 illustrated in FIG. 8. For example, the rocking control section 96 may control whether or not to rock the rocking section 42 on the basis of the result of the determination by the determination section 84 and the distance d between the virtual object 100 and the virtual camera 62 positioned in the virtual space 60.

The rocking control section 96 may control rocking of the rocking section 42 on the basis of the result of the determination by the determination section 84 and the distance d between the virtual object 100 and the virtual camera 62 positioned within an angle of view (image capturing range) of the virtual camera 62. In this regard, the rocking control section 96 may determine the distance d between a position P1 of the point of view of the virtual camera 62 and a position P2 on a front surface of the virtual object 100 which point P2 is closest to the position P1 of the point of view.

Additionally, the rocking control section 96 may determine the distance d between the virtual camera 62 and a virtual object identified from a plurality of virtual objects and located closest to the virtual camera 62.

For example, it is assumed that a plurality of virtual objects are positioned within the angle of view of the virtual camera 62. In this case, the rocking control section 96 may identify, from the virtual objects, the virtual object closest to the virtual camera 62. Then, the rocking control section 96 may determine the distance d between the identified virtual object and the virtual camera 62.

Then, in a case where the determination section 84 determines that the virtual camera 62 is making accelerated motion in the virtual space 60 and the distance d is shorter than a predetermined distance dl, the rocking control section 96 may execute rocking control for rocking the rocking section 42.

Additionally, the rocking control section 96 may control the amount of rocking of the rocking section 42 on the basis of the distance d between the virtual object 100 and the virtual camera 62 positioned in the virtual space 60. For example, the rocking control section 96 may determine the amount of rocking of the rocking section 42 on the basis of the distance d. Then, the rocking control section 96 may control the rocking section 42 such that the rocking section 42 rocks at the determined amount of rocking. In this regard, for example, the amount of rocking determined increases with decreasing distance d. In this case, the rocking section 42 is controlled to rock harder with decreasing distance d.

Additionally, the rocking control section 96 may use an image analysis technique to identify the object in the moving image indicated by the moving image data 68. Then, the rocking control section 96 may identify the amount of movement of the identified object per unit time within the frame image. In this case, the display section 38 may be able to display three-dimensional images, and the rocking control section 96 may replace the three-dimensional image with a two-dimensional image to determine the amount of movement of the object. In other words, when the amount of movement of the object is determined, movement of the object in a depth direction need not be taken into account.

Then, the rocking control section 96 may control rocking of the rocking section 42 on the basis of the amount of movement determined.

The rocking control section 96 may, for example, control whether or not to rock the rocking section 42 on the basis of the amount of movement determined. The rocking control section 96 may, for example, execute rocking control for rocking the rocking section 42 in a case where the amount of movement determined is larger than a predetermined amount of movement.

Additionally, the rocking control section 96 may control the amount of rocking of the rocking section 42 on the basis of the amount of movement determined. For example, the rocking section 42 may be controlled to rock harder with increasing amount of movement determined.

For example, the distance is determined between the center position of an object in the frame image of a certain frame and the center position of the object in the frame image of a frame preceding the above-described frame. Then, on the basis of the distance determined, rocking of the rocking section 42 may be controlled. For example, in a case where the distance determined is longer than a predetermined distance, the rocking control section 96 may execute rocking control for rocking the rocking section 42. Additionally, the rocking section 42 may be controlled to rock harder with increasing distance determined.

In addition, in a case where a plurality of objects are identified in the moving image indicated by the moving image data 68, one of the objects may be identified that has the largest amount of movement within the frame image per unit time. Then, rocking of the rocking section 42 may be controlled on the basis of the amount of movement of the identified object per unit time.

Additionally, the rocking control section 96 may determine a difference between a pixel value for a first pixel included in the frame image of the frame and a pixel value for a second pixel included in the frame image of the preceding frame, the second pixel corresponding to the first pixel. Then, the rocking control section 96 may control rocking of the rocking section 42 on the basis of the total of the differences in pixel value determined for all pixels. For example, in a case where the total determined is larger than a predetermined value, the rocking control section 96 may execute rocking control for rocking the rocking section 42. Additionally, the rocking section 42 may be controlled to rock harder with increasing total determined.

Figure 9:
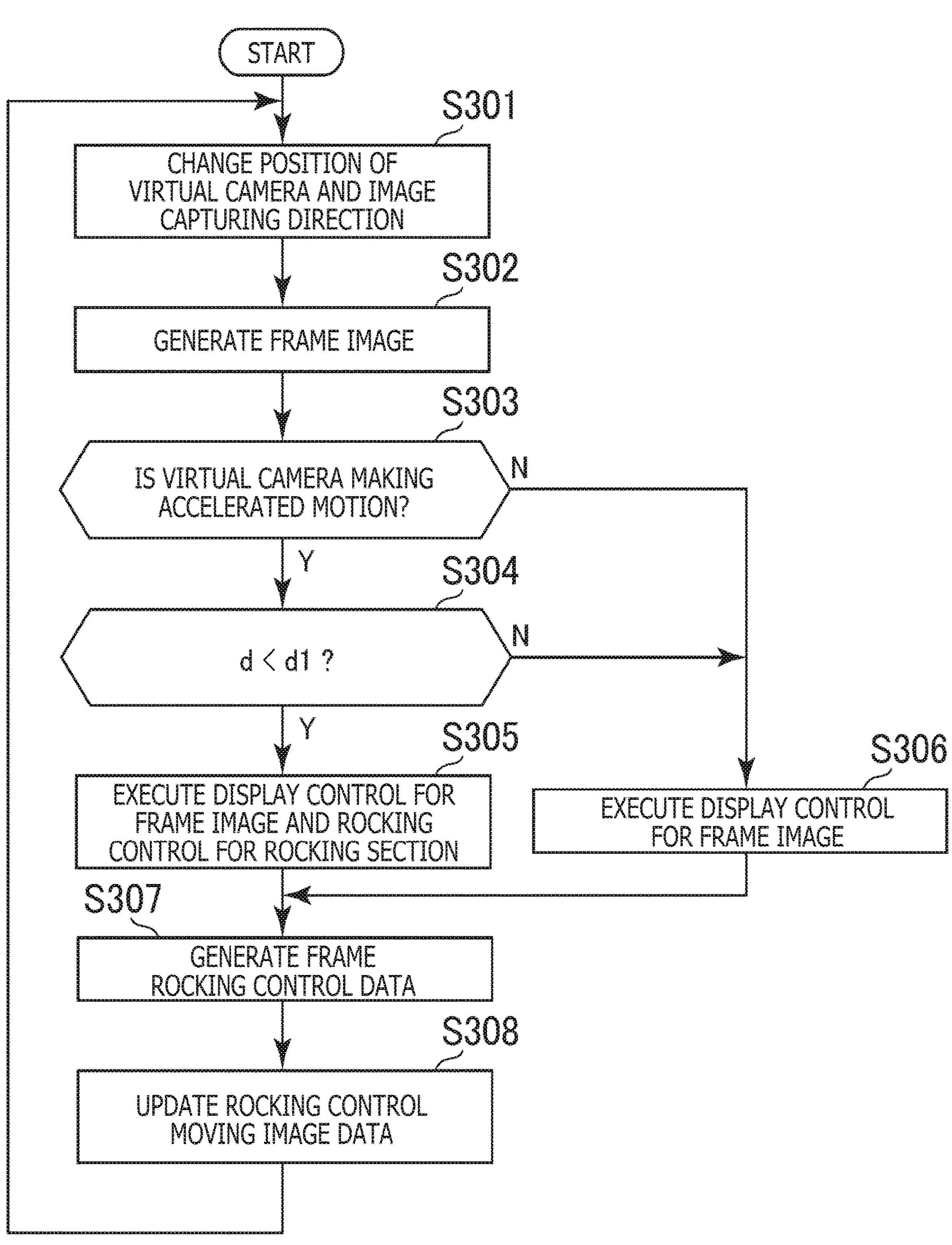
FIG. 9 is a flowchart illustrating an example of a flow of processing executed in the entertainment apparatus according to an embodiment of the present invention.

Here, an example of a flow of another processing executed in the entertainment apparatus 14 according to the present embodiment will be described with reference to a flowchart illustrated in FIG. 9. The processing example illustrated in FIG. 9 is another example of the flow of the rocking control processing of the rocking section 42 based on the motion of the virtual camera 62 as illustrated in FIG. 6. Note that the present processing example assumes that null rocking control moving image data 66 generated by the rocking control moving image data generation section 88 in advance is stored in the rocking control moving image data storage section 90.

Additionally, processing illustrated at S301 to S308 in FIG. 9 is repeatedly executed at the predetermined frame rate.

The processing illustrated at S301 to S303 in FIG. 9 is similar to the processing illustrated at S101 to S103 in FIG. 6 and will thus not be described below.

It is assumed that in the processing illustrated at S303, the virtual camera 62 is determined to be making accelerated motion (S303: Y). In this case, the rocking control section 96 determines the distance d between the virtual camera 62 and the virtual object 100 as described above, and determines whether or not the distance d is shorter than a predetermined distance dl (S304).

In a case where the distance d is shorter than the predetermined distance dl, the display control section 94 executes display control for causing the display section 38 of the HMD 12 to display the frame image generated by the processing illustrated at S302, and the rocking control section 96 executes rocking control for rocking the rocking section 42 (S305). In this case, the rocking section 42 rocks.

It is assumed that in the processing illustrated at S303, the virtual camera 62 is determined not to be making accelerated motion (S303: N). Alternatively, it is assumed that in the processing illustrated at S304, the distance d is determined to be equal to or longer than the predetermined distance dl (S304: N). In either of these cases, the display control section 94 executes display control for causing the display section 38 of the HMD 12 to display the frame image generated by the processing illustrated at S302 (S306). In this case, the rocking section 42 does not rock. In this regard, the rocking control section 96 may execute rocking control for preventing the rocking section 42 from rocking.

When the processing illustrated at S305 or S306 is ended, the rocking control data generation section 86 generates frame rocking control data in the present loop corresponding to the determination results in the processing illustrated at S303 and S304 (S307). In this regard, for example, in a case where the processing illustrated at S305 is executed in the present loop, frame rocking control data with a value of 1 is generated. Additionally, for example, in a case where the processing illustrated at S306 is executed in the present loop, frame rocking control data with a value of 0 is generated.

Then, the rocking control moving image data generation section 88 updates the rocking control moving image data 66 stored in the rocking control moving image data storage section 90 (S308). In this regard, for example, the frame image generated by the processing illustrated at S302 is added to the moving image data 68 included in the rocking control moving image data 66. Additionally, the frame rocking control data in the present loop generated by the processing illustrated at S307 is added to the rocking control data 70 included in the rocking control moving image data 66, the frame rocking control data being associated with the frame image. Then, the loop returns to the processing illustrated at S301.

Note that the processing illustrated at S307 and the processing illustrated at S308 need not necessarily be executed.

Now, an example of a flow of another processing executed in the entertainment apparatus 14 according to the present embodiment will be described with reference to a flowchart illustrated in FIG. 10. The processing example illustrated in FIG. 10 is an example of a flow of rocking control processing of the rocking section 42 executed during reproduction of the moving image indicated by the moving image data 68 included in the rocking control moving image data 66 generated by the processing illustrated at S301 to S308 in FIG. 9.

Figure 10:
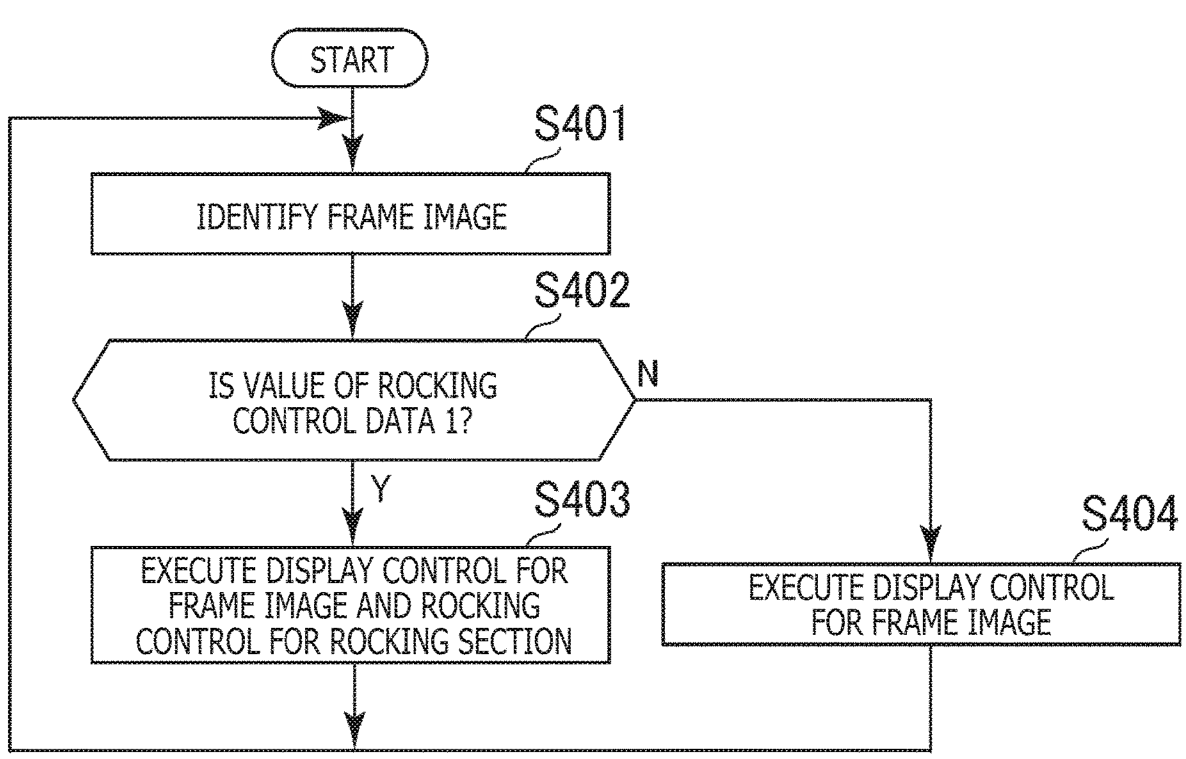
FIG. 10 is a flowchart illustrating an example of a flow of processing executed in the entertainment apparatus according to an embodiment of the present invention.

Additionally, processing illustrated at S401 to S404 in FIG. 10 is repeatedly executed at the predetermined frame rate.

First, the display control section 94 identifies the frame image in the present loop indicated by the moving image data 68 included in the rocking control moving image data 66 (S401).

The determination section 84 checks whether or not the frame rocking control data associated with the frame image identified in the processing illustrated at S401 has a value of 1 (S402).

Here, it is assumed that the determination section 84 confirms that the frame rocking control data has a value of 1 (S402: Y). In this case, the display control section 94 executes display control for causing the display section 38 of the HMD 12 to display the frame image identified by the processing illustrated at S201, and the rocking control section 96 executes rocking control for rocking the rocking section 42 (S403). In this case, the rocking section 42 rocks.

On the other hand, it is assumed that the frame rocking control data is determined to have a value of 0 (S402: N). In this case, the display control section 94 executes display control for causing the display section 38 of the HMD 12 to display the frame image generated by the processing illustrated at S102 (S404). In this case, the rocking section 42 does not rock. In this regard, the rocking control section 96 may execute rocking control for preventing the rocking section 42 from rocking.

Then, the loop returns to the processing illustrated at S401.

In the present embodiment, the above-described frame rocking control data may be data indicating the amount of rocking. In this case, for example, the rocking control data generation section 86 may generate frame rocking control data indicating the amount of rocking. In this regard, in a case where the rocking section 42 is prevented from rocking, the rocking control data generation section 86 may generate frame rocking control data with a value of 0. In this case, the rocking control section 96 may execute rocking control for rocking the rocking section 42 at the amount of rocking indicated by the frame rocking control data.

Note that the present invention is not limited to the above-described embodiment.

For example, the distribution of roles among the HMD 12, the entertainment apparatus 14, and the relay apparatus 16 is not limited to the above-described distribution. For example, some (for example, the display control section 94 and the rocking control section 96) or all of the functions illustrated in FIG. 5 may be implemented in the HMD 12.

Additionally, for example, the rocking control section 96 may turn on and off rocking control of the rocking section 42 in response to operation of the user or the like.

Additionally, the specific character strings and numerical values described above and the specific character strings and numerical values in the drawings are illustrative, and the present invention is not limited to these character strings or numerical value.

The invention claimed is:

1. A system comprising:

one or more processors; and one or more computer readable storage media storing instructions that, when executed by the one or more processors, cause the system to perform operations comprising:

generating, on a display section of a head-mounted display, moving image data corresponding to a moving image, wherein the moving image represents a state of a virtual space from a virtual camera positioned in the virtual space;

determining an acceleration status of the head-mounted display, wherein the acceleration status indicates a state in which a point of view in a frame image of the moving image data is accelerated and is based at least in part on whether the virtual camera is accelerating in the virtual space;

determining a distance between a position of a virtual object in the frame image and a position of the virtual camera providing the point of view;

determining a total difference for all pixel values in the frame image and a preceding frame image; and generating rocking control data to control a rocking of a rocking section of the head-mounted display based at least in part on the acceleration status, the total difference, and a change in the distance, wherein controlling the rocking includes changing the rocking when the total difference changes from the preceding frame image to the frame image.

2. The system of claim 1, the operations further comprising:

determining, based at least in part on the rocking control data, whether or not the point of view of the frame image is accelerating;

generating rocking control moving image data comprising the moving image data and the rocking control data, the frame image in the moving image being determined on a basis of the rocking control data, the frame image corresponding to the point of view that is being accelerated; and controlling whether or not to control rocking of the rocking section depending on a result of the determination of whether or not the point of view of the frame image is accelerating.

3. The system of claim 2, wherein the rocking control moving image data includes the moving image data, and wherein the moving image data indicates that the moving image represents a state of a virtual space viewed from the virtual camera positioned in the virtual space, and wherein the rocking control data is generated based at least in part on the result of the determining whether or not the point of view of the frame image is accelerating.

4. The system of claim 1, wherein the rocking control data is based at least in part on the distance between the virtual camera and the virtual object closest to the point of view of the virtual camera.

5. The system of claim 1, wherein the rocking control data controls an amount of rocking of the rocking section based at least in part on the distance between the virtual camera and the virtual object positioned in the virtual space.

6. The system of claim 1, wherein the rocking control data is based at least in part on an amount of movement of the virtual object in the moving image per unit time.

7. The system of claim 6, wherein controlling the rocking of the rocking section based at least in part on the amount of movement of the virtual object in the moving image per unit time.

8. The system of claim 1, the operations further comprising:

acquiring rocking control moving image data including moving image data indicating the moving image and rocking control data;

determining an acceleration status of the point of view in the frame image; and determining, based at least in part on the rocking control data included in the rocking control moving image data, the acceleration status of the point of view in the frame image displayed on the head-mounted display, and wherein modifying the rocking of the rocking section based on the determination of the acceleration status.

9. The system of claim 1, wherein the rocking section is provided on a front surface of a housing of a head-mounted display, wherein the rocking section is positioned within the head-mounted display such that when the head-mounted display is worn by a user, the rocking section is in physical contact with a forehead of the user.

10. The system of claim 9, wherein the acceleration status is determined based at least in part on a movement of the head-mounted display.

11. The system of claim 1, wherein the operations further comprise:

modifying an amount of the rocking of the rocking section by increasing the amount of rocking based on the distance being less than a predetermined distance.

12. The system of claim 1, wherein the operations further comprise:

modifying an amount of the rocking of the rocking section by decreasing the amount of rocking based on the distance being equal to or greater than a predetermined distance.

13. The system of claim 1, wherein the operations further comprise:

determining a difference between a pixel value of a first pixel in the frame image and a pixel value for a second pixel in the preceding frame image, wherein controlling the rocking is further based on the difference, the first pixel being the same as the second pixel.

14. The system of claim 13, wherein controlling the rocking further comprises:

i) increasing the rocking if the total difference increases from the preceding frame image to the frame image; or ii) decreasing the rocking if the total difference decreases from the preceding frame image to the frame image.

15. The system of claim 1, further comprising: a sensor section configured to output orientation, an amount of rotation, or an amount of movement of the system.

16. The system of claim 1, wherein the rocking section includes a vibration motor, wherein the operations further comprise:

controlling the vibration motor to vibrate in response to the rocking control data in a frequency band between 10 Hz and 20 Hz and an acceleration value between 0.05 G to 0.5 G.

17. A method comprising:

generating, on a display section of a head-mounted display, moving image data corresponding to a moving image, wherein the moving image represents a state of a virtual space;

determining an acceleration status of the head-mounted display, wherein the acceleration status indicates a state in which a point of view in a frame image of the moving image data is accelerated and is based at least in part on whether a virtual camera is accelerating in the virtual space;

determining a distance between a position of a virtual object in the frame image and a position of the virtual camera providing the point of view;

determining a total difference for all pixel values in the frame image and a preceding frame image; and generating rocking control data to control a rocking of a rocking section of the head-mounted display based at least in part on the acceleration status, the total difference, and a change in the distance, wherein controlling the rocking includes changing the rocking when the total difference changes from the preceding frame image to the frame image.

18. The method of claim 17, further comprising:

determining a difference between a pixel value of a first pixel in the frame image and a pixel value for a second pixel in the preceding frame image, wherein controlling the rocking is further based on the difference, the first pixel being the same as the second pixel, and wherein controlling the rocking further comprises:

i) increasing the rocking if the total difference increases from the preceding frame image to the frame image; or ii) decreasing the rocking if the total difference decreases from the preceding frame image to the frame image.

19. A non-transitory, computer readable storage medium containing a computer program, which when executed by a computer, causes the computer to perform a virtual sickness reduction method by carrying out actions, comprising:

generating, on a display section of a head-mounted display, moving image data corresponding to a moving image, wherein the moving image represents a state of a virtual space from a virtual camera positioned in the virtual space;

determining an acceleration status of the head-mounted display, wherein the acceleration status indicates a state in which a point of view in a frame image of the moving image data is accelerated and is based at least in part on whether the virtual camera is accelerating in the virtual space;

determining a distance between a position of a virtual object in the frame image and a position of the virtual camera providing the point of view;

determining a total difference for all pixel values in the frame image and a preceding frame image; and generating rocking control data to control a rocking of a rocking section of the head-mounted display based at least in part on the acceleration status, the total difference, and a change in the distance, wherein controlling the rocking includes changing the rocking when the total difference changes from the preceding frame image to the frame image.

20. The non-transitory, computer readable storage medium of claim 19, wherein executing the computer program further causes the computer to:

determining a difference between a pixel value of a first pixel in the frame image and a pixel value for a second pixel in the preceding frame image, wherein controlling the rocking is further based on the difference, the first pixel being the same as the second pixel, and wherein controlling the rocking further comprises:

ii) increasing the rocking if the total difference increases from the preceding frame image to the frame image; or ii) decreasing the rocking if the total difference decreases from the preceding frame image to the frame image.

* * * * *